United States Patent
Lee et al.

(10) Patent No.: US 10,170,122 B2
(45) Date of Patent: Jan. 1, 2019

(54) SPEECH RECOGNITION METHOD, ELECTRONIC DEVICE AND SPEECH RECOGNITION SYSTEM

(71) Applicant: ASUSTeK COMPUTER INC., Taipei (TW)

(72) Inventors: Yen-Chun Lee, Taipei (TW); Hsiao-Chien Chien, Taipei (TW); Yen-Hwa Chen, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 185 days.

(21) Appl. No.: 15/427,022

(22) Filed: Feb. 7, 2017

(65) Prior Publication Data

US 2017/0243588 A1    Aug. 24, 2017

(30) Foreign Application Priority Data

Feb. 22, 2016   (CN) .......................... 2016 1 0094814

(51) Int. Cl.

| | | |
|---|---|---|
| *G10L 15/26* | (2006.01) | |
| *G10L 15/00* | (2013.01) | |
| *G10L 15/16* | (2006.01) | |
| *G10L 17/00* | (2013.01) | |
| *G10L 21/00* | (2013.01) | |
| *G10L 15/30* | (2013.01) | |
| *G10L 15/06* | (2013.01) | |
| *G10L 25/51* | (2013.01) | |

(52) U.S. Cl.
CPC ............ *G10L 15/30* (2013.01); *G10L 15/063* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 8,566,093 B2* | 10/2013 | Vair | G10L 17/04 704/246 |
| 2017/0164049 A1* | 6/2017 | Wang | G10L 17/02 |
| 2017/0262877 A1* | 9/2017 | Davey | G06Q 30/02 |
| 2018/0174584 A1* | 6/2018 | Chih | G10L 15/25 |
| 2018/0190296 A1* | 7/2018 | Williams | H04M 3/4936 |

FOREIGN PATENT DOCUMENTS

| | | |
|---|---|---|
| CN | 103810998 | 5/2014 |
| TW | 201503105 | 1/2015 |

* cited by examiner

*Primary Examiner* — Satwant Singh
(74) *Attorney, Agent, or Firm* — JCIPRNET

(57) ABSTRACT

A speech recognition method, an electronic device and a speech recognition system are provided. When a local device is not connected to Internet is determined, a voice-print comparison between the received voice data and the history voice data stored in the voice database is executed to obtain the corresponding history voice data, and an associated history text data is found from a result database of the local device according to the obtained history voice data.

10 Claims, 3 Drawing Sheets

SPEECH RECOGNITION METHOD, ELECTRONIC DEVICE AND SPEECH RECOGNITION SYSTEM

CROSS-REFERENCE TO RELATED APPLICATION

This application claims the priority benefit of China application serial No. 201610094814.5, filed on Feb. 22, 2016. The entirety of the above-mentioned patent application is hereby incorporated by reference herein and made a part of specification.

BACKGROUND OF THE INVENTION

Field of the Invention

The invention relates to a speech recognition technology.

Description of the Related Art

As communication technology develops, many technologies associated with speech recognition gradually become necessary for electronic products, which allows users to input information via voice instead of text. It's also a development trend that the speech recognition technology could automatically convert the human voice content to the corresponding text. The speech recognition technology applications include voice dialing, voice navigation, indoor equipment control, voice document search, and dictation data input, and so on.

Currently, a speech recognition database is not configured at a local electronic device, and the speech recognition has to be executed via a remote server via the network. However, when the network connection is bad, the speech recognition cannot be executed.

BRIEF SUMMARY OF THE INVENTION

A speech recognition method includes: determining whether a local device is connected to Internet after an input device receives voice data; transmitting the voice data to a remote server to execute an on-line analysis to obtain a text analysis result when the local device is determined not connecting to Internet; and executing an off-line analysis when the local device is not connected to the Internet is determined. The local device includes a voice database and a result database, the voice database stores a plurality of history voice data, and the result database stores a plurality of history text data associated with the history voice data. The step of executing the off-line analysis includes: executing a voiceprint comparison between the received voice data and the history voice data stored in the voice database to obtain corresponding one of the corresponding history voice data; and finding one of the associated history text data from the result database of the local device according to the corresponding one of the history voice data. The history text data is obtained from the remote server via the on-line analysis in advance.

An electronic device includes an input device, a voice database, a result database, a communication unit and a processor. The input device receives voice data. The voice database stores a plurality of history voice data. The result database stores a plurality of history text data associated with the history voice data. The communication unit is connected to Internet. The processor is coupled to the input device, the voice database, the result database and the communication unit, and the processor determines whether the communication unit is connected to the Internet after the input device receives the voice data. When the communication unit is connected to the Internet is determined, the processor transmits the voice data to a remote server via the communication unit, and an on-line analysis is executed to obtain a text analysis result. When the communication unit is not connected to the Internet is determined, the processor executes an off-line analysis. The step of executing the off-line analysis includes: executing a voiceprint comparison between the received voice data and the history voice data stored in the voice database to obtain corresponding one of the history voice data; and finding one of the associated history text data from the result database of the local device according to corresponding one of the history voice data. The history text data is obtained from the remote server via the on-line analysis in advance.

A speech recognition system includes a local device and a remote server. The local device includes: an input device, receiving a voice data; a voice database, storing a plurality of history voice data; a result database, storing a plurality of history text data associated with the history voice data; a first communication unit, connected to Internet; and a first processor, coupled to the input device, the voice database, the result database and the first communication unit. The processor determines whether the first processor is connected to the Internet after the input device receives the voice data. The remote server includes a second communication unit and a second processor. The second communication unit is connected to the Internet. The second processor is coupled to the second communication unit, and the second processor executes recognition of speech to text on the voice data. When the first communication unit is connected to the Internet is determined by the first processor, the first processor transmits the voice data to a remote server via the first communication unit, and an on-line analysis is executed to obtain a text analysis result. When the first communication unit is not connected to the Internet is determined by the first processor, the first processor executes an off-line analysis. The step of executing the off-line analysis includes: executing a voiceprint comparison between the received voice data and the history voice data stored in the voice database to obtain the corresponding history voice data; and finding one of the associated history text data from the result database of the local device according to the corresponding history voice data. The history text data is obtained from the remote serve via the on-line analysis in advance.

In the disclosure described above, when the local device is connected to Internet, the remote server executes the on-line analysis and continuously collects the history voice data and the history text data. As a result, when the local device is not connected to Internet, the local device executes the off-line analysis based on the collected history data.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
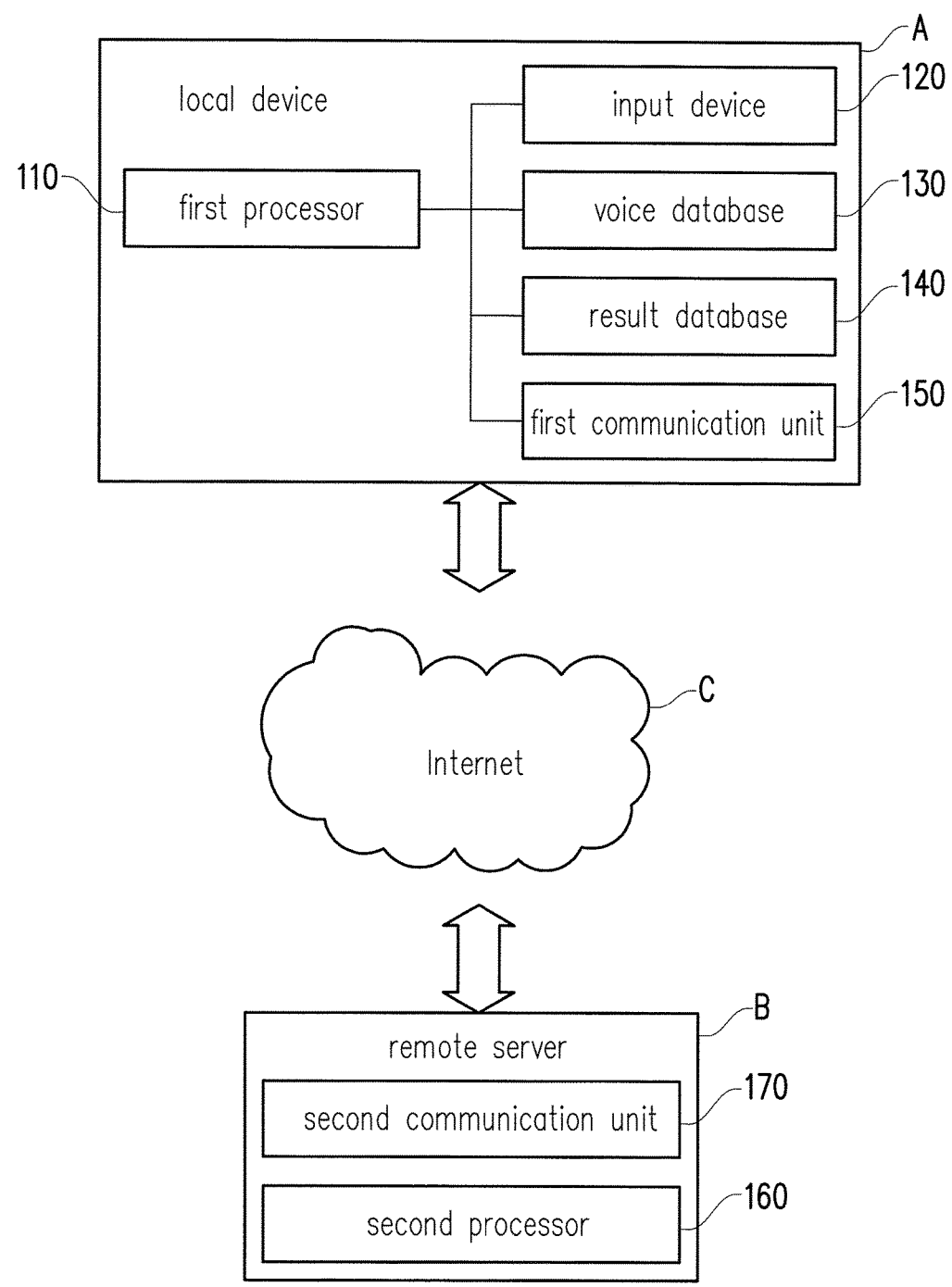
FIG. 1 is a block diagram showing a speech recognition system in an embodiment.

FIG. 1 is a block diagram showing a speech recognition system in an embodiment. Please refer to FIG. 1, a speech recognition system 100 includes a local device A, a remote server B and Internet C. The local device A is connected to the remote server B through Internet C.

The local device A is an electronic device with computing capability, such as a personal computer, a laptop, a tablet computer, a smart phone, a navigation device, or an automotive electronic device, which is not limited herein. The local device A includes a first processor 110, an input device 120, a voice database 130, a result database 140 and a first communication unit 150. The first processor 110 is coupled to the input device 120, the voice database 130, the result database 140 and the first communication unit 150. In embodiments, the voice database 130 and the result database 140 are set in a same storage unit, or in two independent storage units. The storage unit is a non-volatile memory, a random access memory (RAM) or a hard disk, which is not limited herein.

The remote server B is a cloud server with computing capability and provides an on-line analysis function. The remote server B includes a second processor 160 and a second communication unit 170. The second processor 160 executes a speech to text (STT) recognition.

The first processor 110 and the second processor 160 are a central processing unit (CPU), a programmable microprocessor, an embedded control chip, a digital signal processor (DSP), application specific integrated circuits (ASIC) in embodiments, which is not limited herein. The first communication unit 150 and the second communication unit 170 are chips which support a wired or wireless communication protocol in an embodiment. The input device 120 is a radio device, such as a microphone, which is not limited herein.

Figure 2:
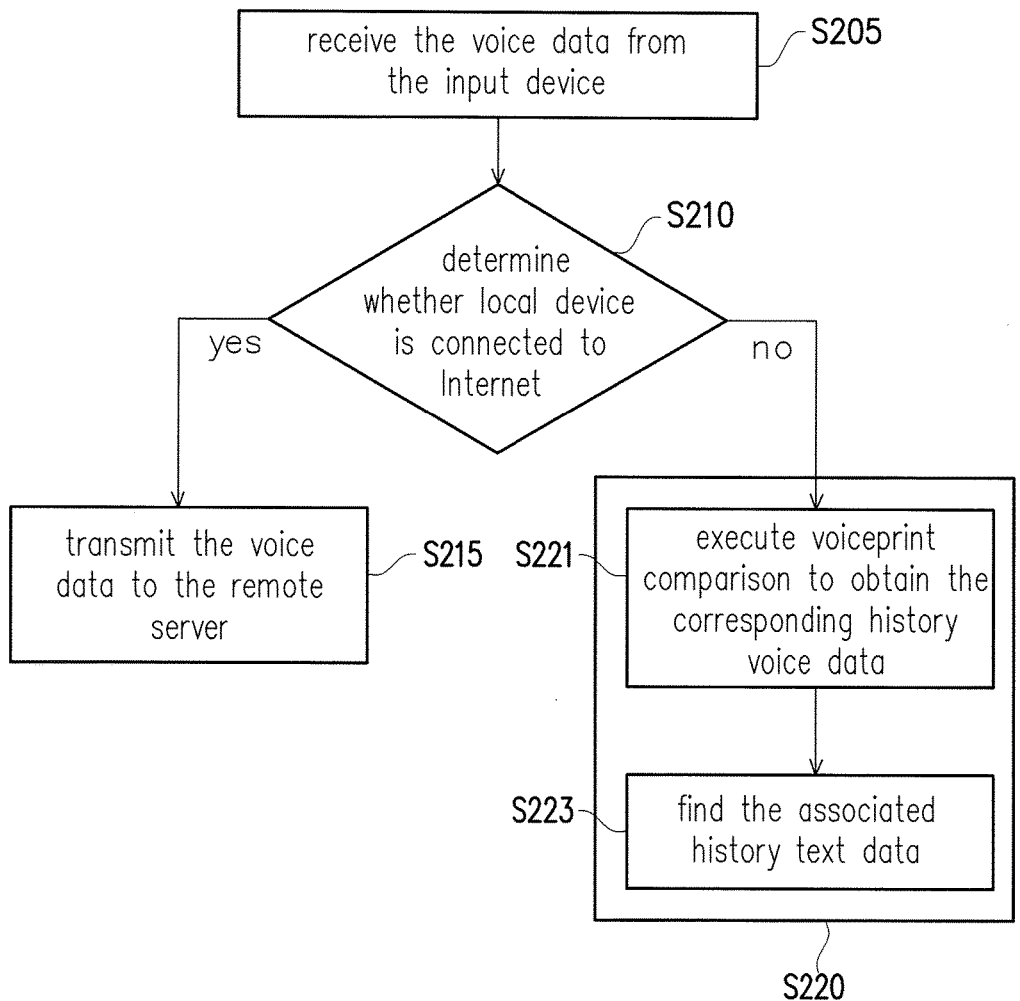
FIG. 2 is a flow chart showing a speech recognition method in an embodiment.

FIG. 2 is a flow chart showing a speech recognition method in an embodiment. Please refer to FIG. 1 and FIG. 2, in step S205, the first processor 110 receives voice data from the input device 120. In other words, the input device 120 collects the voice, and the input device 120 transmits the voice data to the first processor 110.

In step S210, the first processor 110 determines whether the local device A is connected to Internet C. In other words, the first processor 110 determines whether the first communication unit 150 is connected to Internet C currently.

When the local device A is connected to Internet C is determined, as shown in step S215, the local device A transmits the voice data to the remote server B to execute the on-line analysis. In detail, the first processor 110 transmits the voice data to the remote server B via the first communication unit 150, and then the remote server B executes the on-line analysis. The first processor 110 gets the text analysis result from the remote server B, and the text analysis result is stored in the result database 140. The history text data stored in the result database 140 of the local device A is obtained from the remote server B through the on-line analysis in advance.

For example, the remote server B provides a speech recognition module. The speech recognition module includes a signal processing and feature extracting module, an acoustic model, a pronunciation dictionary, a language model and a decoder. The signal processing and feature extracting module extracts features from an input signal (the voice data) and provides the features to the acoustic model. In an embodiment, the acoustic model is modeled via a Hidden Markov Model (HMM), which is not limited herein. The languages are modeled by the language model. The pronunciation dictionary includes multiple vocabularies and pronunciations of the vocabularies to provide a mapping between the acoustic model and the language model. The decoder searches string of words corresponding to the voice data according to the acoustic model, the language model and the pronunciation dictionary. As a result, the second processor 160 utilizes the speech recognition module to execute the recognition of speech to text to covert the voice data to the text data.

When the local device A is not connected to Internet C is determined, in step S220, the local device A executes an off-line analysis. The off-line analysis includes step S221 and step S223.

In step S221, the first processor 110 executes a voiceprint comparison on the voice data to find a corresponding history voice data. That is, the first processor 110 executes the voiceprint comparison between the received voice data and a plurality of history voice data stored in the voice database 130, and then one of the corresponding history voice data is obtained. For example, the first processor 110 compares a waveform of the voice data with a waveform of the history voice data one by one, and then the most similar history voice data is found.

In step S223, the first processor 110 finds the associated history text data from the result database 140 according to the obtained history voice data. Since each history voice data of the voice database 130 is associated with one history text data of the result database 140, after one of the history voice data is obtained, the corresponding history text data is obtained according to the relationship between the history voice data and the history text data.

In an embodiment, when the local device A is connected to Internet, the local device A continuously collects the history voice data and the history text data to set a database for use offline, which is described hereafter.

Figure 3:
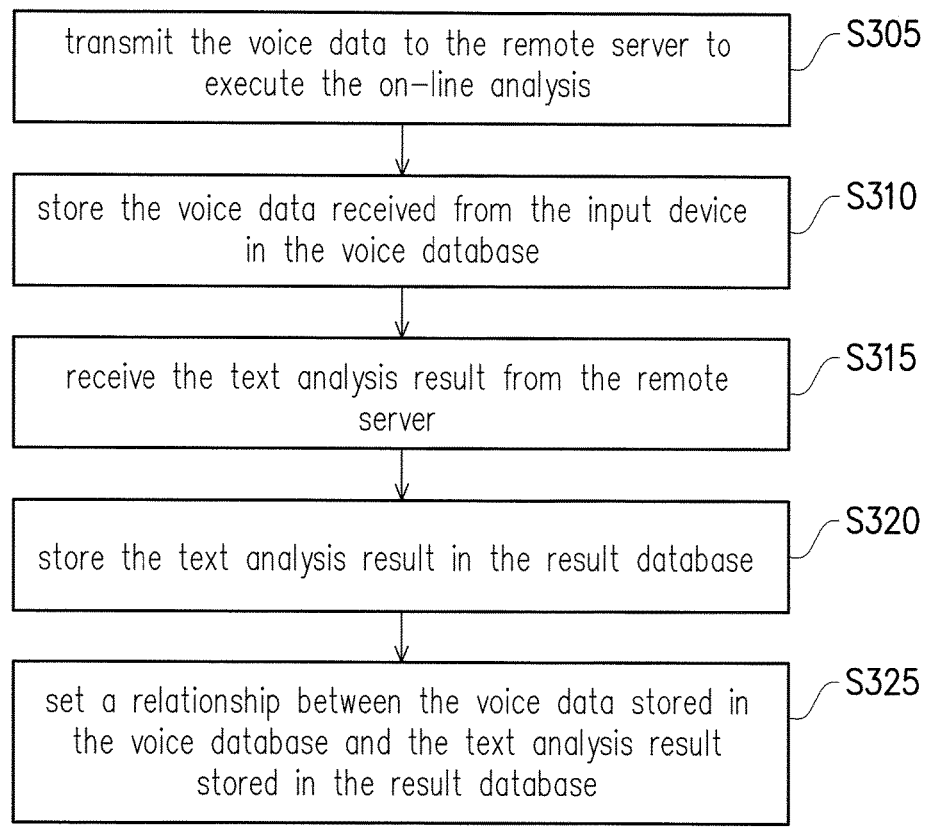
FIG. 3 is a flow chart showing a method of setting a database for use offline in an embodiment.

FIG. 3 is a flow chart showing a method of setting a database for use offline in an embodiment. Please refer to FIG. 1 and FIG. 3, after the first processor 110 receives the voice data from the input device 120, in step S305, the first processor 110 transmits the voice data to the remote server B to execute the on-line analysis when the local device A is determined connecting to Internet C (the determining result is "yes" in step S210 in FIG. 2). For example, the remote server B includes the speech recognition module, and the second processor 160 utilizes the speech recognition module to execute the recognition of speech to text. After the text analysis result is obtained, the second processor 160 transmits the text analysis result to the local device A via the second communication unit 170.

After the first processor 110 receives the voice data from the input device 120, in step S310, the first processor 110 further stores the voice data received from the input device 120 in the voice database 130. As a result, the voice data received from the input device 120 is further stored by an alternative way, which would not affect the current mechanism. In addition, in the embodiment, step S310 and step S305 are not limited in the order.

After the first processor 110 transmits the voice data to the remote server B, in step S315, the first processor 110 receives the text analysis result from the remote server B. In step S320, the first processor 110 stores the text analysis result to the result database 140. As a result, to store the text analysis result received from the remote server B in the result database 140 by an alternative way, which would not affect the current mechanism. The text analysis result stored in the result database 140 is the history text data.

In step S325, the first processor 110 sets a relationship between the voice data stored in the voice database 130 and the text analysis result stored in the result database 140. As a result, the first processor 110 obtains the corresponding history text data according to the voice database 130 and the result database 140 when the off-line analysis is executed. In other words, after the similar history voice data is obtained from the voice database 130, the corresponding history text data is obtained from the result database 140 according to the relationship.

In addition, when the first processor 110 cannot get the similar history voice data after the voiceprint comparison, the first processor 110 generates a prompt message. For example, the prompt message notifies the user to connect to Internet C to execute the on-line analysis.

When the off-line analysis is executed, the first processor 110 transmits the history text data obtained from the result database 140 to an output device (such as a screen). When the on-line analysis is executed, the first processor 110 transmits the text analysis result obtained from the remote server B to an output device.

In sum, when the local device A is connected to Internet C, the remote server B executes the on-line analysis and continuously collects the history voice data and the history text data to set the database for use offline. As a result, when the local device A is not connected to Internet C, the local device A executes the off-line analysis based on the voice database 130 and the result database 140.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. A speech recognition method, comprising:
   determining whether a local device is connected to Internet after an input device receives voice data, wherein the local device includes a voice database and a result database, the voice database stores a plurality of history voice data, and the result database stores a plurality of history text data associated with the history voice data;
   transmitting the voice data to a remote server to execute an on-line analysis to obtain a text analysis result when the local device is connected to Internet is determined; and
   executing an off-line analysis when the local device is determined not connecting to Internet, wherein the step of executing the off-line analysis includes:
      executing a voiceprint comparison between the received voice data and the history voice data stored in the voice database to obtain corresponding one of the history voice data; and
      finding one of the associated history text data from the result database at the local device according to the corresponding one of the history voice data, wherein the history text data is obtained from the remote server via the on-line analysis in advance.

2. The speech recognition method according to claim 1, wherein after the input device receives the voice data, the method further includes:
   storing the voice data received from the input device in the voice database;
   storing the text analysis result in the result database after the remote server receives the text analysis result when the local device is connected to Internet is determined; and
   setting a relationship between the voice data stored in the voice database and the text analysis result stored in the result database.

3. The speech recognition method according to claim 1, wherein the method further includes: executing recognition of speech to text on the voice data to obtain the text analysis result when the remote server receives the voice data.

4. The speech recognition method according to claim 1, wherein the method further includes:
   transmitting the corresponding one of the history text data found from the result database to an output device when the off-line analysis is executed; and
   transmitting the text analysis result obtained from the remote server to the output device when the on-line analysis is executed.

5. The speech recognition method according to claim 4, wherein the input device is a microphone, and the output device is a screen.

6. An electronic device, comprising:
   an input device, receiving voice data;
   a voice database, storing a plurality of history voice data;
   a result database, storing a plurality of history text data associated with the history voice data;
   a communication unit, connected to Internet;
   a processor, coupled to the input device, the voice database, the result database and the communication unit, wherein the processor determines whether the communication unit is connected to Internet after the input device receives the voice data;
   when the communication unit is connected to Internet is determined, the processor transmits the voice data to a remote server via the communication unit, and an on-line analysis is executed to obtain a text analysis result,
   when the communication unit is not connected to Internet is determined, the processor executes an off-line analysis, wherein the processor executes the off-line analysis includes: executing a voiceprint comparison between the received voice data and the history voice data stored in the voice database to obtain corresponding one of the history voice data; and finding one of the associated history text data from the result database of the local device according to the corresponding one of the history voice data,
   wherein the history text data is obtained from the remote server via the on-line analysis in advance.

7. The electronic device according to claim 6, wherein the processor stores the voice data received from the input device in the voice database; the processor stores the text analysis result in the result database after the remote server receives the text analysis result when the local device is connected to Internet is determined; and the processor sets a relationship between the voice data stored in the voice database and the text analysis result stored in the result database.

8. The electronic device according to claim 6, wherein the electronic device further includes:
   an output device, coupled to the processor;
   wherein the output device outputs the corresponding one of the history text data found from the result database when the off-line analysis is executed, and
   the output device transmits the text analysis result obtained from the remote server when the on-line analysis is executed.

9. The electronic device according to claim 8, wherein the input device is a microphone, and the output device is a screen.

10. A speech recognition system, comprising:
   a local device including:
      an input device, receiving a voice data;
      a voice database, storing a plurality of history voice data;
      a result database, storing a plurality of history text data associated with the history voice data;
      a first communication unit, connected to Internet;

a first processor, coupled to the input device, the voice database, the result database and the first communication unit, wherein the processor determines whether the first processor is connected to Internet after the input device receives the voice data; and
a remote server including:
  a second communication unit, connected to Internet; and
  a second processor, coupled to the second communication unit and executing recognition of speech to text on the voice data;
wherein when the first communication unit is connected to Internet is determined by the first processor, the first processor transmits the voice data to a remote server via the first communication unit, and an on-line analysis is executed to obtain a text analysis result;
when the first communication unit is not connected to Internet is determined by the first processor, the first processor executes an off-line analysis, wherein the step of executing the off-line analysis includes: executing a voiceprint comparison between the received voice data and the history voice data stored in the voice database to obtain the corresponding history voice data; and finding one of the associated history text data from the result database of the local device according to the corresponding history voice data,
wherein the history text data is obtained from the remote serve via the on-line analysis in advance.

\* \* \* \* \*